(12) United States Patent
Weitz (10) Patent No.: US 11,223,574 B2
(45) Date of Patent: Jan. 11, 2022

(54) MULTI-STAGE SWITCHING TOPOLOGY

(71) Applicant: Google LLC, Mountain View, CA (US)

(72) Inventor: Konstantin Weitz, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/728,717

(22) Filed: Dec. 27, 2019

(65) Prior Publication Data

US 2021/0203618 A1 Jul. 1, 2021

(51) Int. Cl.
*H04L 12/933* (2013.01)
*H04L 12/935* (2013.01)
*H04L 12/931* (2013.01)

(52) U.S. Cl.
CPC ...... *H04L 49/1515* (2013.01); *H04L 49/3072* (2013.01); *H04L 49/356* (2013.01); *H04L 49/70* (2013.01)

(58) Field of Classification Search
None
See application file for complete search history.

(56) References Cited

U.S. PATENT DOCUMENTS

| 5,535,373 | A | 7/1996 | Olnowich |
| 8,340,088 | B2 | 12/2012 | Sindhu et al. |
| 9,692,716 | B2 | 6/2017 | Meng et al. |
| 2007/0030845 | A1* | 2/2007 | Hill ............... H04Q 11/06 370/369 |
| 2008/0315985 | A1 | 12/2008 | Johnsen et al. |
| 2010/0239266 | A1 | 9/2010 | Kash et al. |
| 2020/0028786 | A1* | 1/2020 | Chachmon ......... H04L 45/22 |

OTHER PUBLICATIONS

OLA Torudbakken et al. "A 50Tbps optically-cabled Infiniband datacenter switch", Mar. 17, 2013, IEEE XP032427232, pp. 1-3 (Year: 2013).*

(Continued)

*Primary Examiner* — Kouroush Mohebbi
(74) *Attorney, Agent, or Firm* — Lerner, David, Littenberg, Krumholz & Mentlik, LLP (57) ABSTRACT

A novel multi-stage folded Clos network and a linecard for use in a network is disclosed. The Clos network can consist of three stages, an access stage, a lower stage, and an upper stage. The access stage and the upper stage can include a plurality of switches or conventional access points. The lower stage can include a plurality of linecards. Each linecard can be made of two switch chips, each of which are connected to the ports of the linecard, and contain the same number of ports. Each switch chip can forward information in only one direction and one is used to send direction from the access stage to the upper stage, and the other from the upper stage to the access stage. The lower stage can consist of a number of sub-stages, each sub-stage can be entirely of either conventional switches or linecards. Accordingly, compared to a conventional Clos network, the provided network can increase the throughput by any power of 2 by replacing the conventional switches used in the lower stage or sub-stages with linecards.

20 Claims, 7 Drawing Sheets

Linecard 200

(56) References Cited

OTHER PUBLICATIONS

Torudbakken et al. A 50Tbps Optically-Cabled Infiniband Datacenter Switch. Optical Fiber Communication Conference and Exposition and the National Fiber Optic Engineers Conference (OFC/NFOEC), 2013, IEEE, Mar. 17, 2013 (Mar. 17, 2013), pp. 1-3, DOI: 10.1364/0FC.2013.0TU3H.1.
Extended European Search Report for European Patent Application No. 20210994.8 dated Feb. 3, 2021. 11 pages.
Hassen F, Mhamdi L. A scalable multi-stage packet-switch for data center networks. Journal of Communications and Networks. Mar. 10, 2017;19(1):65-79.
ABS, Dennis & John Kim, "High Performance Datacenter Networks," Synthesis Lectures on Computer Architecture #14, copyright 2011 by Mrogan & Claypool, 115 pages.
Hojabr R, Modarressi M, Daneshtalab M, Yasoubi A, Khonsari A. Customizing clos network-on-chip for neural networks. IEEE Transactions on Computers. Jun. 14, 2017;66(11):1865-77.
Jeloka S, Das R, Dreslinski RG, Mudge T, Blaauw D. Hi-Rise: a high-radix switch for 3D integration with single-cycle arbitration. In2014 47th Annual IEEE/ACM International Symposium on Microarchitecture Dec. 13, 2014 (pp. 471-483). IEEE.
Chrysos N, Minkenberg C, Rudquist M, Basso C, Vanderpool B. SCOC: High-radix switches made of bufferless clos networks. In2015 IEEE 21st International symposium on high performance computer architecture (HPCA) Feb. 7, 2015 (pp. 402-414). IEEE.
Ahn JH, Binkert N, Davis A, McLaren M, Schreiber RS. HyperX: topology, routing, and packaging of efficient large-scale networks. InProceedings of the Conference on High Performance Computing Networking, Storage and Analysis Nov. 14, 2009 (p. 41). ACM.
Hassen F, Mhamdi L. High-capacity Clos-network switch for data center networks. In2017 IEEE International Conference on Communications (ICC) May 21, 2017 (pp. 1-7). IEEE.
Kim J, Dally WJ, Abts D. Flattened butterfly: a cost-efficient topology for high-radix networks. ACM SIGARCH Computer Architecture News. Jun. 9, 2007;35(2):126-37.
Kim JD. High-radix interconnection networks. Stanford University; Mar. 2008.
Rojas-Cessa R, Lin CB. Scalable two-stage Clos-network switch and module-first matching. In2006 Workshop on High Performance Switching and Routing Jun. 7, 2006 (pp. 6-pp). IEEE.
Yuan X. On nonblocking folded-clos networks in computer communication environments. In2011 IEEE International Parallel & Distributed Processing Symposium May 16, 2011 (pp. 188-196). IEEE.

* cited by examiner

MULTI-STAGE SWITCHING TOPOLOGY

BACKGROUND

A folded Clos topology combines a large number of small switches to create a much larger virtual switch. A Clos topology consists of two stages. An upper stage (aka spine), and a lower stage. Every switch in the lower stage is connected to every switch in the upper stage. The upper stage allows for information to be transported between switches of the lower stage. Folded Clos topology are one way to create large virtual switches from small switches, but there are also other ways, such as a butterfly network or a dragonfly network. The upper and/or lower stages of the network can be built from Clos topologies themselves, and can thus consist of several sub-stages. The Clos topology can also be said to be made of three stages when an access stage, which connects to a lower stage, is considered.

A Clos topology includes multiple stages of switches. A switch is a hardware device, which includes a number of ports, and interconnects stages of the Clos topology through the ports. The number of ports on the switch is also referred to as the switch radix. A spine switch, such as a switch in the upper stage, receives information from a switch in the lower stage and sends this information back to the appropriate switch in the lower stage. In this manner, the spine switch allows for the flow of information between switches of the lower stage. In a typical 4-port switch in the lower stage, two ports are used to connect to the upper stage, while the other two ports are free, and can be connected to any network device, such as a host, in the access stage.

However, existing Clos topologies do not exploit the full radix of the switches in the lower stage. Existing switches allow for information received by any port on the switch to be sent to any other port on the switch, but switches in the lower stage only need to forward to a subset of their ports. More recent architectures such as flattened butterfly and dragonfly have emerged as alternative lower-cost architectures but suffer from performance issues and complexity in other areas such as oversubscription and manageability.

SUMMARY

One aspect of the technology provides a system including an upper stage consisting of a plurality of traditional switches, a lower stage consisting of one or more linecards, each of the linecards comprising a plurality of upper ports and a plurality of lower ports, a bottom-up switch, and a top-down switch, wherein all traffic moving from the lower stage to the upper stage is received by a bottom up switch and sent via the bottom up switch to the upper stage, and all traffic moving from the upper stage to the lower stage is received by a top-down switch and sent via the top-down switch to the lower stage.

Another aspect of the technology provides a linecard including a plurality of upper ports, a plurality of lower ports, a bottom-up switch, a top-down switch, first connections between the plurality of the lower ports, the bottom up switch, and the upper ports, second connections between the plurality of lower ports, the top-down switch, and the upper ports, and wherein all traffic received at a lower port is sent to the upper port via first connections, and all traffic received at an upper port is sent to a lower port via second connections.

Another aspect of the technology provides a linecard including a plurality of upper ports, a plurality of lower ports, a bottom-up switch, a top-down switch, first connections between the plurality of the lower ports, the bottom up switch, and the upper ports, second connections between the plurality of lower ports, the top-down switch, and the upper ports, wherein all traffic received at a lower port is sent to the upper port via first connections, and all traffic received at an upper port is sent to a lower port via second connections, configuring the line card to have an equal number of upper ports and lower ports, configuring the ports to be connected to the bottom-up switch and top-down switch of the linecard, configuring the ports of the bottom-up switch and the top-down switch to have separate connections or interfaces for incoming traffic and outgoing traffic, and using printed circuit boards, metallic wires, or optical wires to create the first connections and/or second connections.

Another aspect of the technology provides a method to create a folded Clos network, the method including providing an upper stage consisting of traditional switches, providing a lower stage consisting of one or more linecards, providing an access stage consisting of one or more access points, connecting the ports of the traditional switches with the ports of the linecards, connecting the ports of the access points with the ports of the linecards, wherein each of the one or more linecards comprises a plurality of upper ports and a plurality of lower ports, a bottom-up switch, and a top-down switch, measuring the network for network parameters, and optimizing the network for at least one metric based upon the measured network parameters.

DETAILED DESCRIPTION

The technology generally relates to a system that provides the ability to double the non-blocking throughput of a folded Clos topology. This is achieved by replacing a conventional switch used in a Clos topology with a new linecard which consists of two switch chips that each forward information uni-directionally. The present technology provides a method, system, and apparatus to create a topology including a multi-stage arrangement of independent switches. This topology may be used in various networks, such as data centers, wide area networks (WANs), or local area networks (LANs). The topology addresses an arrangement of switches and linecards in a network, as well as an arrangement of the switches with respect to one another and other network components.

A folded Clos network or folded Clos topology combines a number of small switches to create a much larger virtual switch. A virtual switch is one that is equivalent to a physical switch with a given number of input and output ports. Every stage of a Clos topology is made of switches. A switch is a hardware device—which consists of a number of ports—and interconnects stages of the Clos topology through the ports.

The number of ports on the switch is also referred to as the switch radix. A switch in the upper stage or spine receives information from a switch in the lower stage and sends this information back to the appropriate switch in the lower stage. In this manner, a switch in the upper stage allows for the flow of information between switches of the lower stage. In a typical 4-port switch in the lower stage, two ports are used to connect to the upper stage, while the other two ports are free, and can be connected to any network device, such as a host. While these principles are discussed on a 4-port switch, the same principle apply when the switches have a larger number of switches, such as for example, an 8-port, 16-port, or 32 port switch.

However, existing Clos topologies do not exploit the full radix of the switches in the lower stage. Existing switches allow for information received by any port on the switch to be sent to any other port on the switch, but switches in the lower stage only need to forward to a subset of their ports.

The technology provides a technique and a device which can accomplish doubling the throughput of the Clos topology by replacing existing switches in the lower stage with 4-port linecards. The new linecard or chassis switch can be made of two two-port switch chips, one of which can be used to forward information from free ports to the upper stage while the other can be used to forward information from the upper stage to free ports. If all conventional switches in the lower stage are replaced with such new linecards, the maximum amount of information which can be sent through the Clos topology can be doubled. A key feature of the technology is that other than replacement of conventional switches to linecards, other aspects of the network do not need to be modified to achieve this increased throughput. The technology also provides techniques and devices to replace existing switches with any number of ports, such as a k-port switch, with a linecard with the same number of ports, such as a k-port linecard.

A non-blocking network is one in which the input nodes and output nodes of the network are connected in such a manner that any combination of input and output nodes can communicate with one another at their respective port speeds, when particular conditions are met. Port speed is a measure of how fast information can be transmitted or received by a port interface. A folded Clos topology can always be configured to be non-blocking when particular conditions are met, making it a suitable topology for network applications involving multiple devices which request and/or send information from one another. However, the throughput of the non-blocking Clos topology is limited by the number of switches comprising the network.

Figure 1A:
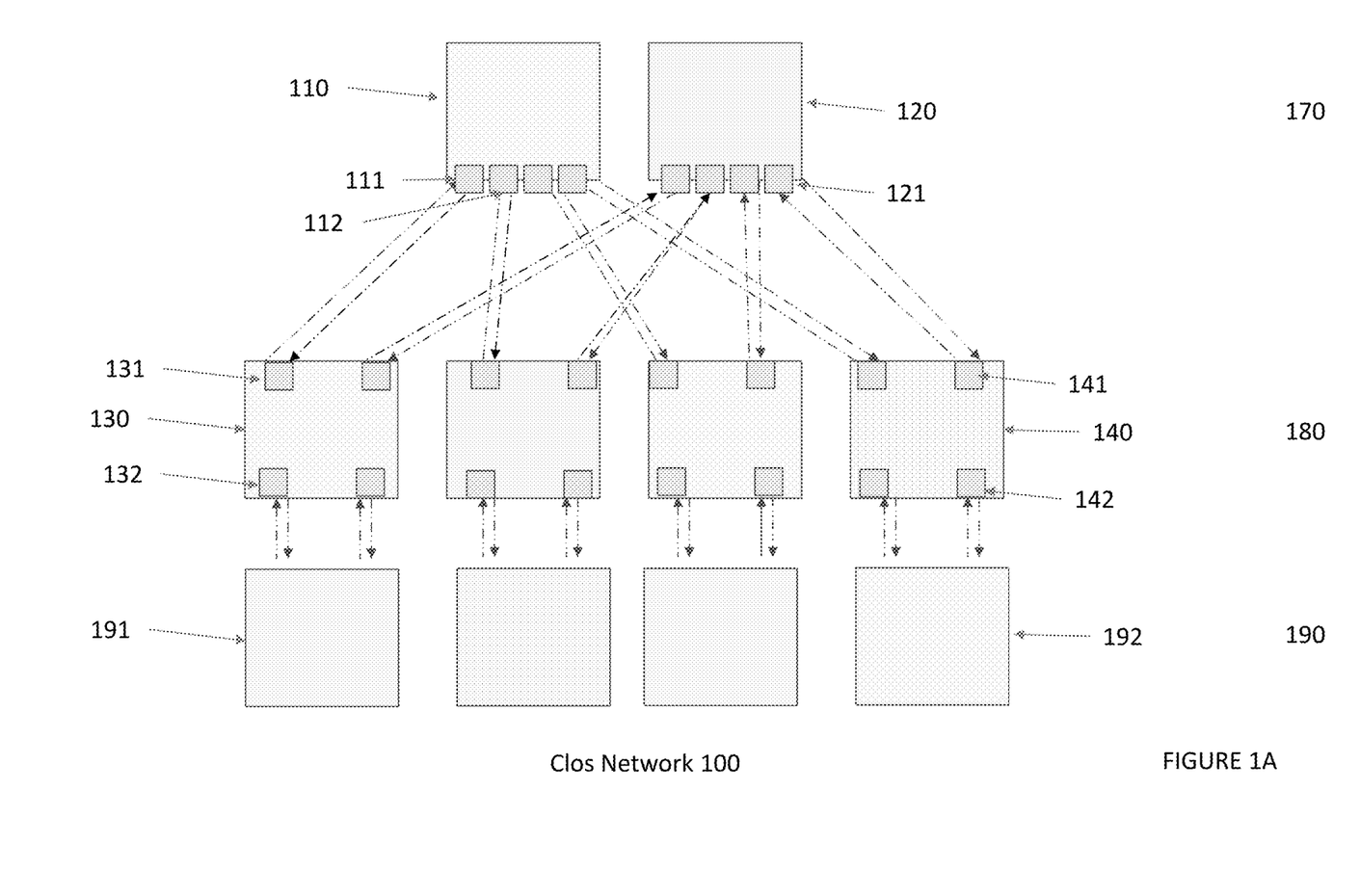
FIG. 1A illustrates a three stage folded Clos network.

FIG. 1A illustrates an example of a three stage folded Clos network, such as Clos network 100. FIG. 1A illustrates a Clos network with three stages: an upper stage 170, a lower stage 180, and an access stage 190. The upper stage 170 can have connections (which are illustrated but not numbered in FIG. 1A) with lower stage 180 and similarly, the lower stage 180 can have connections with the access stage 190. An upper stage, such as the upper stage 170, can include one or more switches, such as switch 110 and switch 120. Although only two switches are depicted in FIG. 1A, the upper stage 170 can be made of any finite number of switches. First switch 110 can further contain a number of first ports, such as port 111, and port 112. Similarly, second switch 120 can contain a number of second ports, such as port 121. The switches making up the upper stage 170 can contain as many ports as needed to connect with the switches of the lower stage 180. Lower stage 180 can include a number of switches, such as switch 130 and switch 140. Lower stage 180 can be made from any multitude of switches. Switch 130 can further include several ports, some interfacing with upper stage 170, and others interfacing with lower stage 180. For example, port 131 can interface with upper stage 170 by connecting with switch 110. Other ports can interface with other switches of upper stage 170, allowing for every switch of the middle stage to interface with the upper stage 170. Similarly, port 132 can interface with access stage 190 by connecting with access point 191. Thus, any access point can connect with any other access point through the Clos network. For example, access point 191 can connect with access point 192 through a path routed through access point 191 to switch 130, switch 130 to switch 110, switch 110 to switch 140, and switch 140 to access point 192. Links between stages 170, 180, and 190 can be made one or combination of multiple suitable technologies. For example, printed circuit boards, metallic wires, or optical wires can be used to interlink the various stages. Although the switches are depicted with 2 upper ports and 2 lower ports, the switches can contain any number of ports. The switches also allow for information received by any port of the switch to be sent to any other port of the switch, but switches in the lower stage only need to forward to a subset of their ports.

Figure 1B:
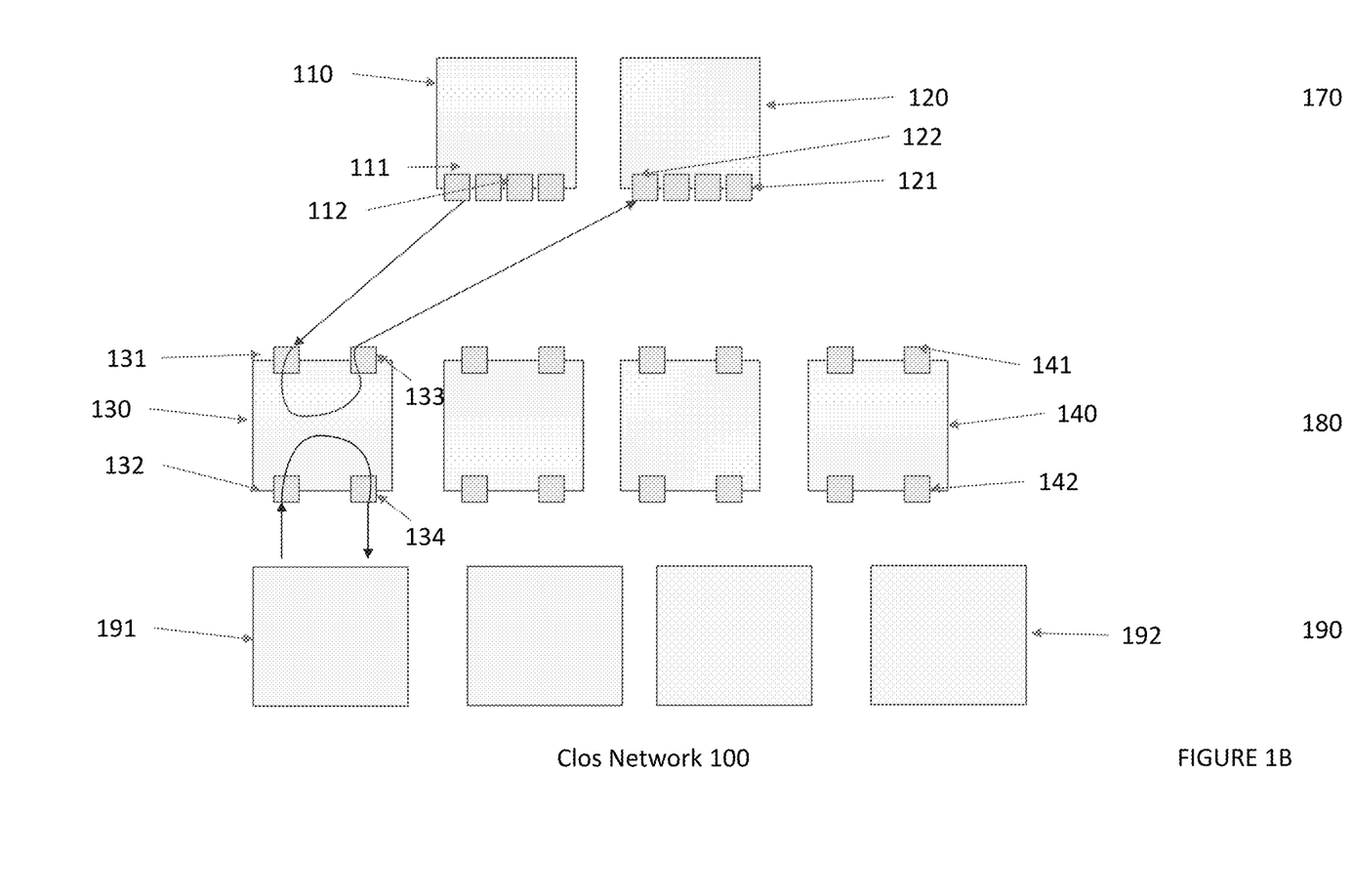
FIG. 1B illustrates example paths taken in a three-stage folded Clos network.

FIG. 1B is another illustration of a folded Clos topology which illustrates a subset of the set of paths that data flowing through the topology can take. Illustrated in FIG. 1B is Clos network 100. In FIG. 1B upper stage 170, the lower stage 180, and the access stage 190 are connected as illustrated in FIG. 1A, but these intra-connections have been omitted in the figure for clarity.

One path that data can take is the path illustrated with a loop, such as a path originating in switch 110 of the upper stage 170, through port 111 of switch 110, into port 131 of switch 130, through port 133 of switch 130, and into port 121 of switch 120 of the upper stage 170. Similarly, another path can originate at access point 191 of access stage 190, move to the middle stage 180 through port 132 of switch 130, through port 134 of switch 130, and back to access point 191 of access stage 190. Other similar paths can exist—between switches of the upper stage, such as switch 120 of upper stage 170, and switches of the middle stage, such as switch 140 of middle stage 180—and between access points in the access stage, such as access point 192 and switches of the middle stage, such as switch 140 of the middle stage 180. These paths can occur because of the structure of the switch 130. However, in practical applications, these paths are not needed as data coming from one point does not need to go back to the same point. By removing the possibility of these paths, the non-blocking throughput, that is the amount of information that can simultaneously be sent through the folded Clos topology, can be increased.

Figure 2:
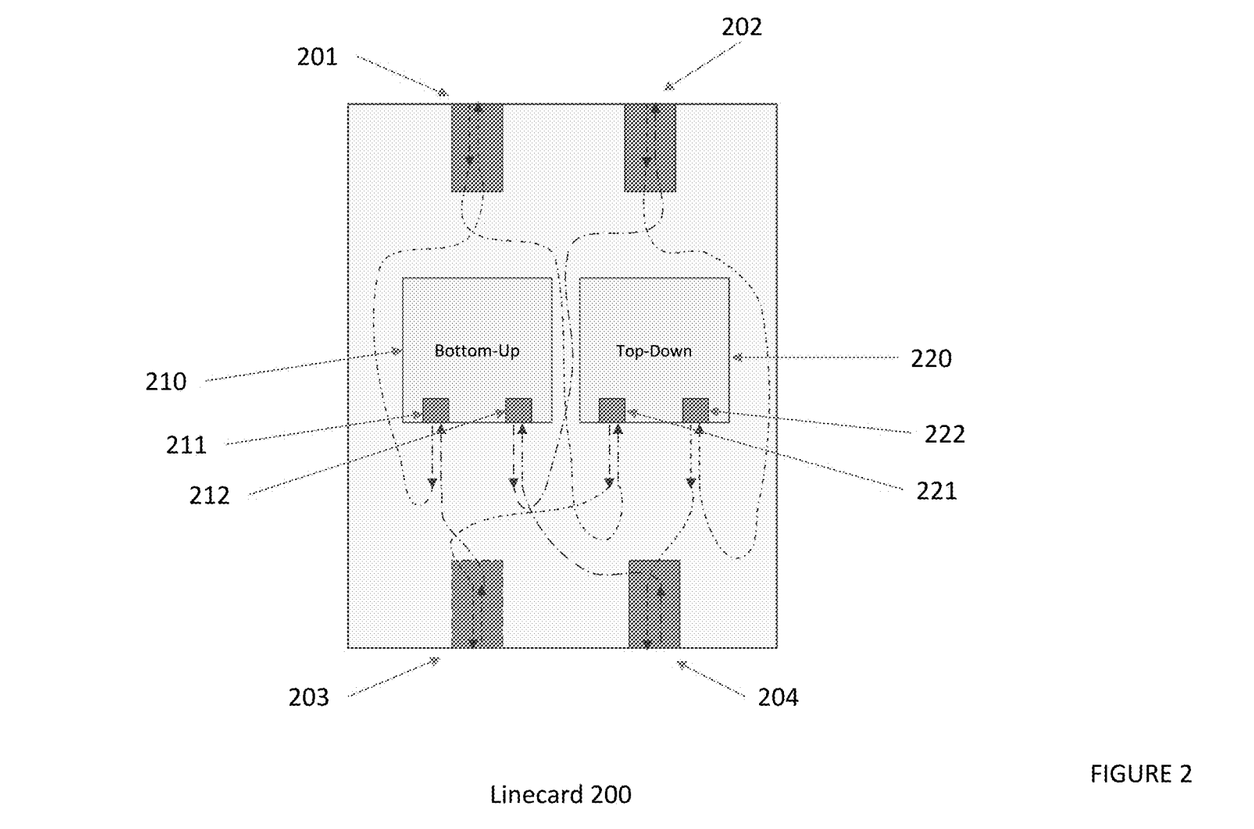
FIG. 2 illustrates a linecard according to an aspect of the technology.

FIG. 2 illustrates a device, particularly a linecard 200, according to one aspect of the current technology. Linecard 200 can contain for example, four ports, such as port 201, port 202, port 203, and port 204. Ports 201-204, can in a manner similar to the ports 131-134 discussed above, be connected to various stages of a network, such as a Clos network, with for example some of the ports being connected to an upper stage of a network while other ports are connected to an access stage. For example, port 201 and port 202 can be connected to the upper stage of a network while port 203 and port 204 are connected to an access stage of a network. Ports 201-204 can for example be bidirectional ports, that is, the ports 201-204 can both receive and send information to the respective stages to which they are connected. For example, port 201 can both receive information from and send information to an upper stage. Ports 201-204, and in turn the linecard 200, can further be configured to be connected with one another to only allow information received by a port connected to one stage to send information to ports connected to another stage. For example, port 203, which can be connected to an access stage can only send information it receives from the access stage to port 201 and port 202, which are connected to an upper stage. Similarly, each port can be configured to forward information only to the ports which are not connected to the same stage as the port itself.

The configuration discussed in the paragraph above can be created, for example, through the use of two-port switch chips, such as switch chip 210 and switch chip 220. Switch chip 210 can contain, for example, two ports, port 211 and port 212. Similarly, switch chip 220 can contain, for example two ports, port 221 and port 222. In an example, switch chip 210 can be configured to receive information flowing upwards through a network (that is, information flowing from an access stage to an upper stage received by either port connected to an access stage, such as port 203 and port 204) and send this received information upwards (that is, send the information received to a port connected to the upper stage such as port 201 and port 202). For example, switch chip 210 can receive this upwards flowing information from port 203 or port 204 at port 211 and port 212 respectively. Switch chip 210 can for example, after receiving this information at either port 211 or port 212 forward this information to port 201 or port 202 respectively. Once received at port 201 or port 202, the information can then be forward onwards to the upper stage.

Similarly, switch chip 220 can be configured to receive information flowing downwards through a network (that is, information flowing from an upper stage to an access stage received by either port connected to the upper stage, such as port 203 and port 204) and send this received information downwards (that is, send the information received to a port connected to the access stage, such as port 203 and port 204). For example, switch chip 220 can receive information flowing downwards from port 201 and port 202 at port 221 and port 222 respectively. Switch chip 220 can for example, after receiving this information at either port 221 or port 222, forward this downwards flowing information to port 203 or port 204 respectively.

Switch chips 210 and 220 can also be described as unidirectional forwarding switches, that is, they only receive and forward information in one direction. Switch 210 and switch 220 can also thus be described as "bottom-up" and "top-down" switches, respectively as they receive information from a bottom/lower stage or upper stage respectively, and forward the information up or down through the stages of the network. Thus, linecard 200 allows for information to be received and sent without information being looped back to the same stage from which the information was received as was the case illustrated in FIG. 1B. Linecard 200 does not allow for connections between ports connecting to the same stage of the Clos topology, such as between port 201 and port 202, and between port 203 and port 204. As further explained below, this configuration allows for the radix of linecard 200 to be double that of switch 130.

As illustrated in FIG. 2, the configuration above can be achieved, for example, by physically connecting wires from the port of the linecard, such as linecard 200, to the ports of the switch chips, such as switch chip 210 or switch chip 220. Incoming traffic wires can be connected to different linecard ports than the outgoing traffic wires. This can be achieved, for example, if a switch chip has in its ports different electrical wires, socket connections, for traffic that is incoming to the switch chip and traffic that is outgoing from the switch chip. In another example, the same result can be achieved by configuring the switch chip to either receive or send traffic using software. In yet another example, the switch chip and its wires can be patterned onto a printed circuit board in a manner that differentiates the incoming and outgoing traffic.

Figure 3:
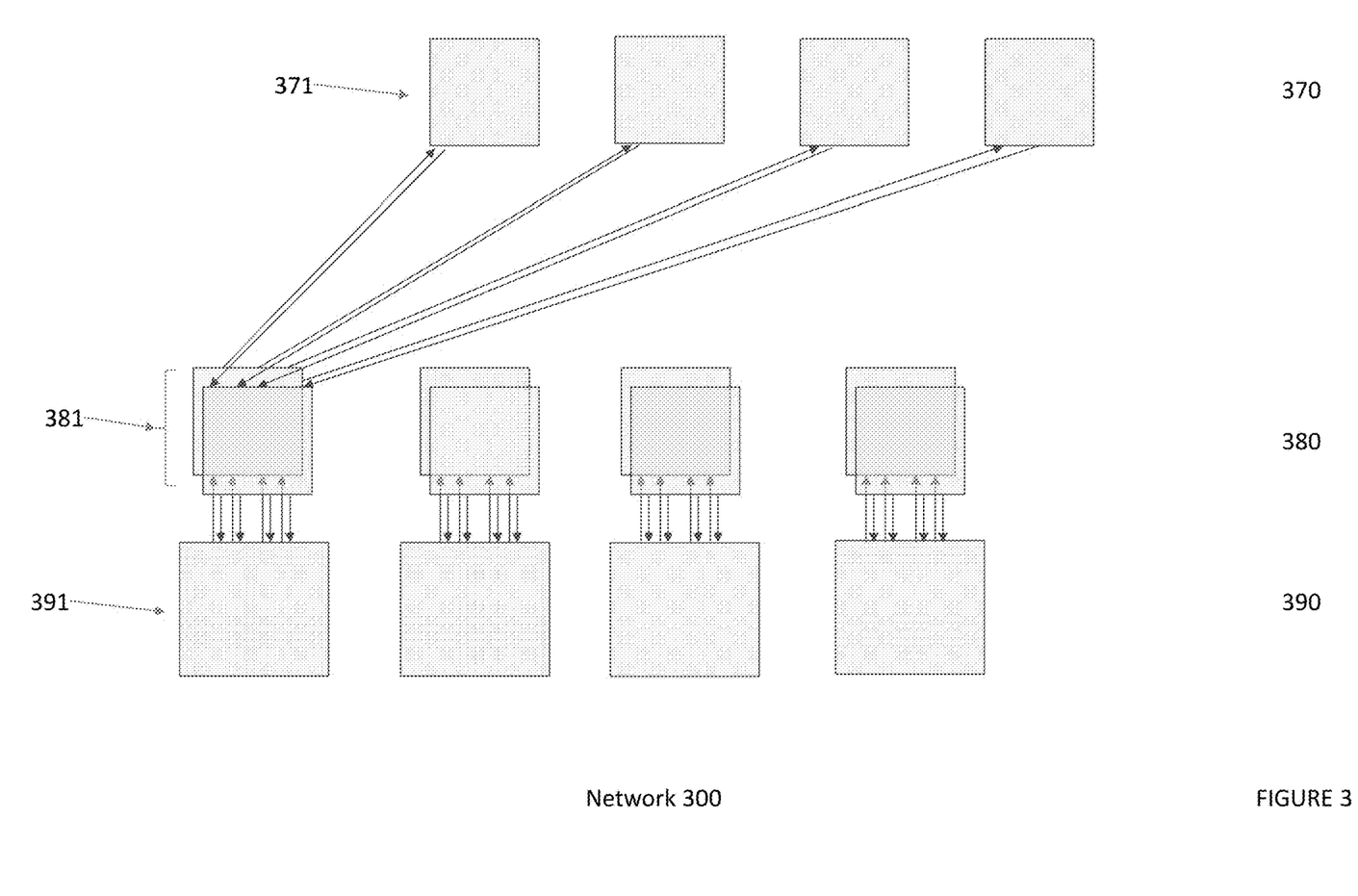
FIG. 3 illustrates example connections within a network according to an aspect of the technology.

FIG. 3 illustrates a representation of some of the data connections within a network according to one aspect of the current technology, network 300. FIG. 3 illustrates the equivalent network achieved by replacing a prior art switch, such as switch 130, with a linecard of the present disclosure, such as linecard 200. Network 300 can be made of an upper stage 370, lower stage 380, and an access stage 390. Similar to the stages in network 100, the upper stage 370 can consist of a number of switches, and the access stage 390 can be made of a number of access points, such as access point 391. The lower stage 380 can be made of a number of line switches, such as line switch 381. Components of stages 370, 380, and 390 contain ports to receive and send information which are not illustrated in FIG. 3. Although not illustrated in FIG. 3 links exist between every switch of the upper stage 390 and the linecards of the lower stage 380. Although linecard 381 is depicted as two separate components, linecard 381 is one component which can be, for example, similar to linecard 200 illustrated in FIG. 2, and is illustrated as a bifurcated switch to show the equivalent number of non-blocking connections. Compared to a Clos network known in the prior art, such as network 100, network 300 illustrates twice the number of data connections which can simultaneously be utilized in the network. For example, linecard 381 has 8 connections to the upper stage as compared to switch 130 of network 100, which only has 4 connections. Each linecard in lower stage 380 similarly has double the number of connections when compared to a switch in lower stage 180.

Figure 4:
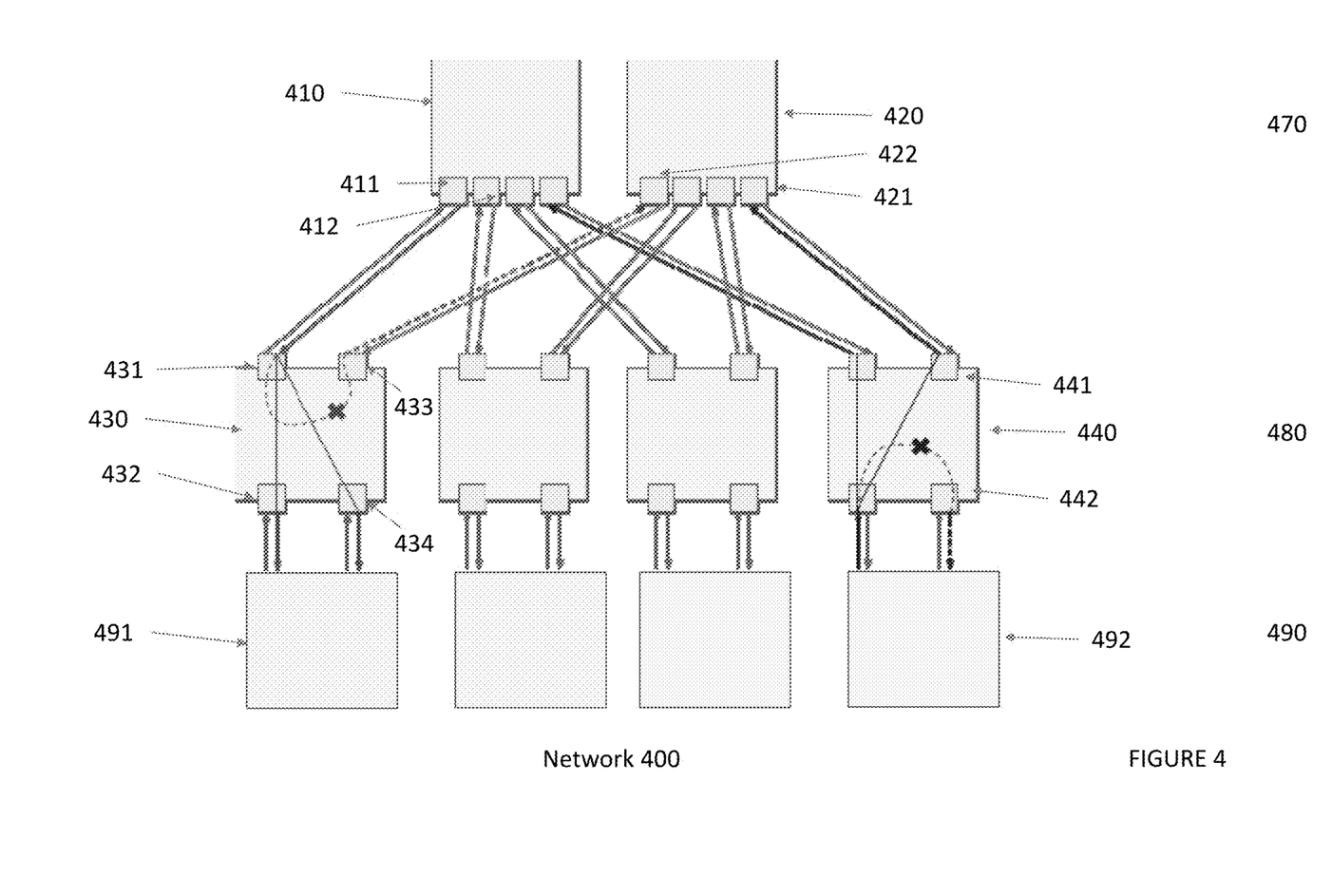
FIG. 4 illustrates example connections within a network according to an aspect of the technology.

FIG. 4 illustrates an example of information flowing through a network of the present technology, network 400. Network 400 contains an upper stage, such as upper stage 470, made of upper switches, such as such as switch 410 and switch 420, which can be for example 4 port switches; a lower stage, such as lower stage 480, made only of linecards, such as linecards 430 and 440; and an access stage, such as access stage 490 made of access points, such as access point 491 and 492. Further, a plurality of bidirectional ports are illustrated in FIG. 4, such as ports 431-434, ports 441-442, and ports 411, 412, 421, and 422. Illustrated in a dotted line with an 'x' is a path that information traveling from upper switch 410 to access point 491 cannot take through linecard 430. Similarly illustrated in a dotted line with an 'x' is a path that information travelling from an access point 492 to switch 420 cannot take through linecard 440. Replacing conventional switches with linecards of the present technology prevents these paths from ever being taken, and allows for the throughput of information through the network to be doubled.

Figure 5:
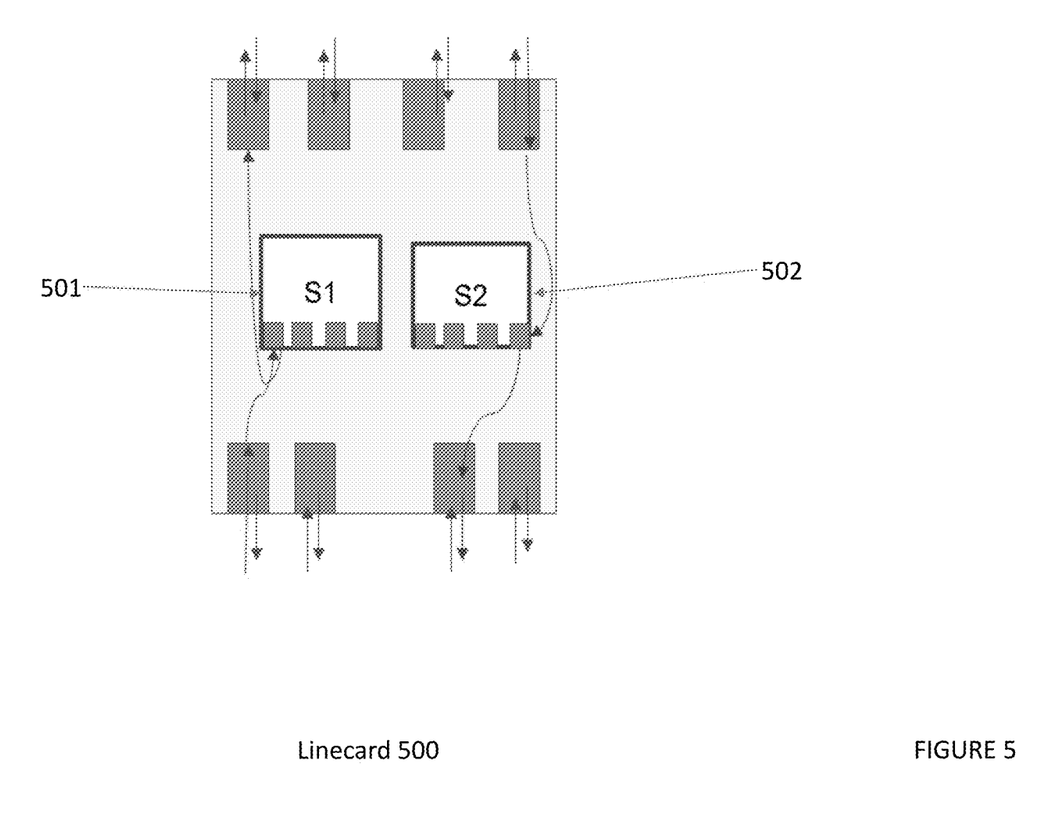
FIG. 5 illustrates a generalized linecard according to an aspect of the technology.

FIG. 5 illustrates an example of a linecard of the current technology. As illustrated in FIG. 5, the linecard can consist of a plurality of ports (not labeled), which can to other stages in a network, such as an access stage and upper stage. All ports receiving information from a first stage, such as an access stage and sending it to a second stage, such as an upper stage, can be connected to a switch chip, such as switch chip 501 (labeled S1). Similarly, all ports receiving information from a second stage, such as an upper stage and sending it to a first stage, such as an access stage, can be connected to a second switch chip, such as switch chip 502 (labeled S2). Switch chips 501 and 502 can contain, for example, the number of ports to which they are connected. Also illustrated in FIG. 5 are exemplary flows of information through switch chips 501 and 502.

Although FIG. 5 illustrates an 8 port linecard, with 4 ports connecting to a first stage of a network, and 4 ports connecting to a second stage of a network, and switch chips with 4 ports each, the configuration of the linecard can be modified to accommodate any number of ports. The results above can be generalized. In a general case, n-port switches in the lower stage can be replaced with 2n-port linecards. The 2n-port linecard can be made of a set of switch chips, S1 and S2, wherein each switch chip is an n-port switch. In this manner, the throughput of each Clos-topology can be improved by up to a factor of 2 by replacing all n-port switches in the lower stage with 2n-port linecards.

The lower stage of the Clos network can include additional sub-stages. For example, multiple additional stages can be connected with one another, in pairs, to create the lower stage of the Clos network. When the lower stage consists of additional sub-stages, the conventional switches in the sub-stages can be replaced entirely with linecards. In the case where each sub-stage has the same number of switches, by replacing the switches with linecards in, for example, the above-described manner, the throughput of the network can be increased by a factor of $2^R$, where R is the number of sub-stages wherein a conventional switch is replaced with a linecard. In the case where each sub-stage has a different number of switches, the throughput of the network will also be increased by a factor of $2^R$, where R is the number of sub-stages wherein a conventional switch is replaced with a linecard.

In another example, n-port switches in the lower stage can be replaced with n-port linecards, where the n-port refers to the number of ports of the linecard or switch. The n-port linecard can be made of a set of switch chips, such as switch chips S1 and S2, wherein each switch chip has n/2 ports. In this manner, the throughput of each Clos-topology can be improved by a factor of 2 by replacing all n-port switches in a lower stage with n-port linecards.

In another example, only some of the sub-stages can be made of line cards while other stages can be made of conventional switches. By replacing the switches with linecards in the above-described manner, the throughput of the network can be increased by a factor of 2R, where R is the number of sub-stages made of line cards.

Figure 6:
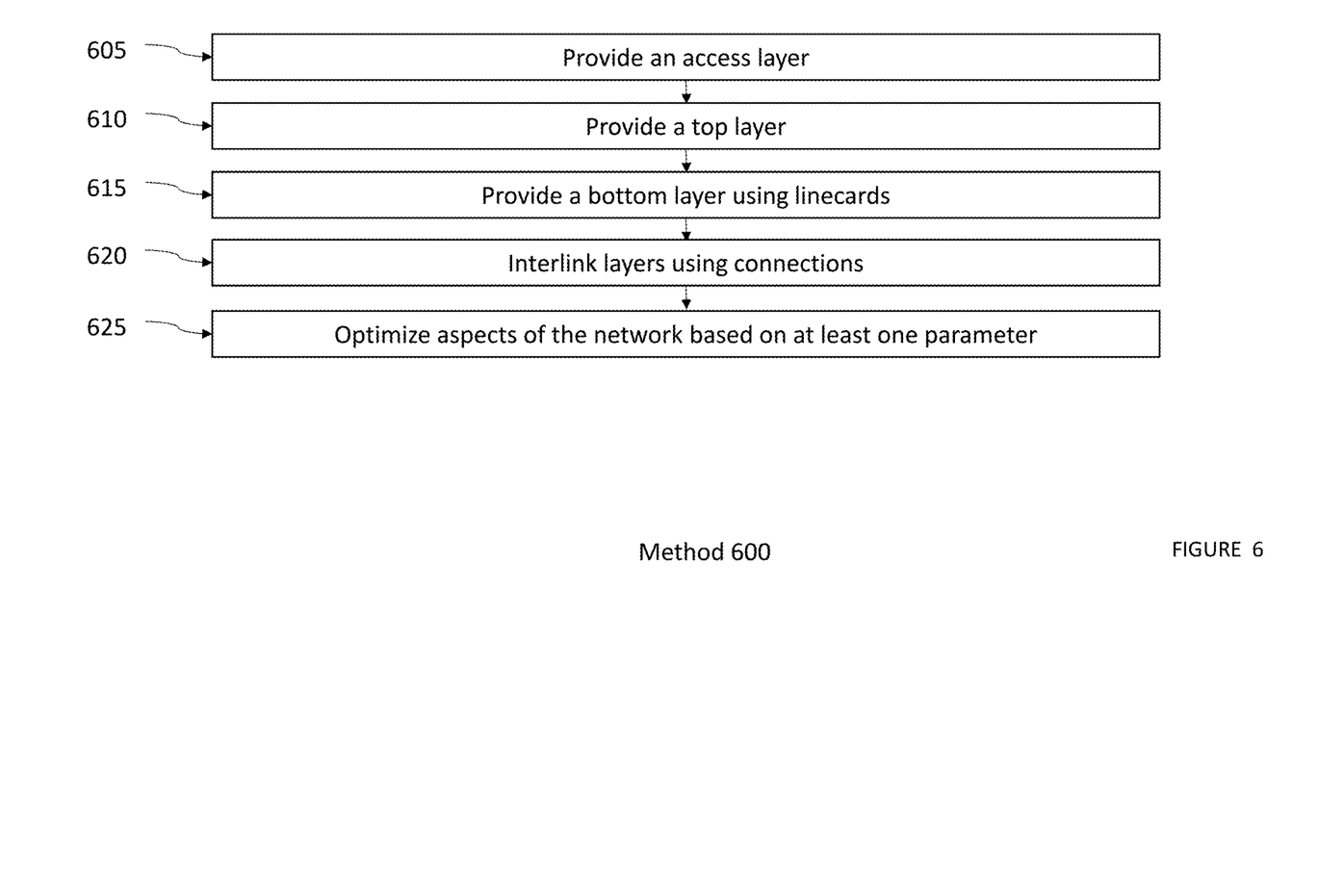
FIG. 6 illustrates a method according to aspects of the technology.

FIG. 6 illustrates a method 600 according to aspects of the technology. According to this method, a non-blocking Clos topology network can be created which can increase the non-blocking throughput of the network as compared to a network created from conventional switches. The network may be any type of network, such as a data center, a LAN, or a WAN, or even a multi-stage processing chip. While various operations of the method are illustrated and described in a particular order, it should be understood that they do not have to be performed in this order. Rather, various operations may be handled in a different order or simultaneously, and operations may also be added or omitted unless otherwise stated.

Method 600 begins at block 605. In block 605, an access stage can be provided. The access stage can consist of access points. Access points can be any suitable device. In block 610, an upper stage can be provided. The upper stage, such as upper stage 470, can be made of conventional switches. In block 615, a lower stage can be provided, which is made of linecards, such as linecard 200. The linecards in this stage can have as many ports as necessary based on the overall configuration of the network. This can be repeated as needed to create a lower stage that consists of multiple sub-stages. In block 620, the various stages of the network can be linked by connecting the ports making up the various stages with any suitable technology. For example, Ethernet wires or other optical wires can be used to connect the ports of the switches, devices, and linecards comprising the network. In block 625, the network can be further optimized based on any given parameter. Any suitable parameter can be chosen, such as the latency of the network.

In other examples, information can be obtained concerning the network, and based on the obtained information, aspects of the network can be optimized. For example, a particular path can be identified within the network. Optimization can be based on, for example, linear or non-linear optimization methods, including but not limited to Dijkstra's algorithm, machine algorithms, gradient methods, dynamic programming, integer programming, or generalized iterative scaling. Information used to optimize a parameter of the system can constitute for example, historic data about the system, or simulated demands on the system. For example, the throughput, latency, or number of connections available to a particular path within the topology may be optimized. For example, only some conventional switches may be replaced with linecards based on the historic data about the system to increase the throughput between start and end points within a network.

The above-described aspects of the technology may be advantageous in increasing the bandwidth and throughput within a network. For example, the throughput of the network can be increased by any power of 2. Another key feature of the technology is that other than replacement of conventional switches to linecards, other aspects of the network do not need to be modified to achieve this increased throughput. Thus, upgrades within existing networks can be made without modifying the manner in which a user of the network interacts or interfaces with the network.

It should be understood that the examples herein are merely illustrative. For example, it should be understood that the described system and method may be implemented over any network, such as the Internet, or any private network connected through a router. For example, the network may be a virtual private network operating over the Internet, a local area network, or a wide area network. Additionally, it should be understood that numerous other modifications may be made to the illustrative examples.

The foregoing examples are not mutually exclusive, but may be implemented in various combinations to achieve unique advantages. These and other variations and combinations of the features discussed above may be utilized without departing from the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible examples. Further, the same reference numbers in different drawings may identify the same or similar elements.

Although the present disclosure herein has been described with reference to particular examples, it is to be understood that these are merely illustrative of the principles and applications of the present disclosure. It is therefore to be understood that numerous modifications may be made and that other arrangements may be devised without departing from the spirit and scope of the present disclosure as defined by the appended claims.

The invention claimed is:

1. A system comprising:
   an upper stage, the upper stage comprising one or more upper stage switches;
   a lower stage comprising one or more linecards, each of the one or more linecards comprising:
      a plurality of upper ports;
      a plurality of lower ports;
      a unidirectional bottom-up forwarding switch; and
      a unidirectional top-down forwarding switch;
      wherein traffic moving from the lower stage to the upper stage is received by the unidirectional bottom up forwarding switch and sent to the upper stage, and traffic moving from the upper stage to the lower stage is received by the unidirectional top-down forwarding switch and sent to the lower stage.

2. The system of claim 1 wherein each of the one or more linecards comprises an equal number of upper ports and lower ports.

3. The system of claim 1 wherein the lower stage further comprises at least two sub-stages.

4. The system of claim 3 wherein the sub-stages are entirely comprised of linecards.

5. The system of claim 3 wherein each sub-stage within the lower stage comprises either traditional switches or linecards.

6. The system of claim 3 wherein each of the at least two sub-stages comprises both switches and linecards.

7. The system of claim 1 further comprising an access stage, wherein the access stage comprises a plurality of access points.

8. The system of claim 7 wherein the access points are computing devices.

9. The system of claim 7 wherein the access points are storage devices.

10. A linecard comprising:
    a plurality of upper ports;
    a plurality of lower ports;
    a unidirectional bottom-up forwarding switch;
    a unidirectional top-down forwarding switch;
    first connections between the plurality of the lower ports, the unidirectional bottom-up forwarding switch, and the upper ports;
    second connections between the plurality of lower ports, the unidirectional top-down forwarding switch, and the upper ports;
    wherein traffic received at a lower port is sent to the upper port via the first connections, and traffic received at an upper port is sent to a lower port via the second connections.

11. The linecard of claim 10 wherein the plurality of upper ports and lower ports are equal in number.

12. The linecard of claim 10 wherein there are two upper ports and two lower ports.

13. The linecard of claim 10 wherein ports of the bottom-up switch and ports of the top-down switch are connected to the ports of the linecard.

14. The linecard of claim 13 wherein each port of the unidirectional bottom-up forwarding switch and the unidirectional top-down forwarding switch has a separate connection for incoming traffic and a separate connection for outgoing traffic.

15. The linecard of claim 14 wherein the first connections and the second connections comprise optical wires.

16. The linecard of claim 14 wherein the first connections and the second connections are made on printed circuit boards.

17. The linecard of claim 14 wherein the first connections and the second connections are made from metallic wire.

18. A method to create a folded Clos network comprising:
    providing an upper stage comprising one or more upper stage switches;
    providing a lower stage comprising one or more linecards, wherein each of the one or more linecards comprises:
       a plurality of upper ports;
       a plurality of lower ports,
       a unidirectional bottom-up forwarding switch, and
       a unidirectional top-down forwarding switch;
    providing an access stage comprising one or more access points;
    connecting ports of the one or more upper stage switches with the upper ports of the linecards; and
    connecting the lower ports of the linecards with ports of the one or more access points.

19. The method of claim 18 further comprising optimizing the folded Clos network for at least one parameter.

20. The method of claim 19 wherein optimizing the folded Clos network for the at least one network parameter comprises adding linecards to the lower stage.

* * * * *